United States Patent Office 2,746,854
Patented May 22, 1956

2,746,854

TOBACCO DESUCKERING BACTERICIDAL COMPOSITION

Howard L. Yowell, Westfield, and Donald A. Caldwell, Mountainside, N. J., assignors to Esso Research and Engineering Company, a corporation of Delaware No Drawing. Application July 31, 1952, Serial No. 301,985

10 Claims. (Cl. 71—2.5)

This invention relates to improved agricultural compositions for desuckering tobacco plants. More particularly, it relates to emulsifiable desuckering compositions possessing parasiticidal properties.

Tobacco is a billion dollar crop in the United States. Much of the labor required to grow this crop is spent in manually breaking out the sucker buds to increase the leaf yield and quality.

Utilization of oils to desucker tobacco plants, especially Burley, sometimes tends to make them more susceptible to soft rot, a bacterial plant disease.

It has now been found that the susceptibility to soft rot disease is sharply reduced when aqueous emulsions of petroleum mineral white oils containing specific types of parasiticidal agents, N-trichloromethylthio imides of dicarboxylic acids, are used to desucker the tobacco plants. Furthermore, the use of these emulsions has no adverse effect on tobacco quality. Buyers and processors cannot distinguish between tobacco from untreated plants and tobacco from plants treated with the composition of the present invention.

The petroleum, mineral, white oils utilized for this purpose are mainly paraffinic and/or naphthenic, aromatic-free oils similar to those prepared by the well-known exhaustive sulfuric acid treatment of petroleum distillate to remove substantially all aromatics. Their preparation, i. e., by treating with fuming or concentrated sulfuric acid, is well known in the art. These acid treated oils have specific gravities in the range of about 0.800–0.885, a viscosity range SUS at 100° F. of 80–370, a boiling point predominantly in the range of about 550–1000° F., and are substantially free of aromatics, i. e., contain only a trace. Typical inspection is as follows:

| | |
|---|---|
| Viscosity SUS at 100° F. | 150 |
| Specific gravity | 0.864 |
| A. S. T. M. Dist., ° F.: | |
| I. B. P. | [1] 564 |
| F. B. P. | [1] 975 |
| Aniline point, ° F. | 230 |
| Flash point, ° F. | 352 |
| Test for unsulfonated residue | 99.9 |
| Sulfur | 0.007 |
| Color, Saybolt | +30 |
| Per cent aromatics | Trace |

[1] Equivalent atmospheric pressure values.

The requirements for the emulsifying agents employed are rather specific in nature, i. e., not all emulsifying agents work in the compositions of this invention. However, both synthetic, oil-soluble non-ionic and anionic emulsifying agents have been used. Typical emulsifiers by trade name and chemical description are as follows: Antarox A 401, alkyl aryl polyoxyethylene glycol ether; Nonisol 210, polyethylene glycol oleate; Triton X45, alkylated aryl polyether alcohol; and a petroleum sulfonate modified with a minor amount of a non-ionic emulsifier. The alkyl aryl polyoxyethylene glycol ethers are especially effective and desirable.

The parasiticidal agents employed are the N-trichloromethylthio imides of dicarboxylic acids. The preparation of the latter is given in U. S. Patent No. 2,553,771, issued May 22, 1951 to A. R. Kittleson and H. L. Yowell. These compounds are particularly effective in reducing the incidence of soft rot. Typical of the N-trichloromethylthio imides of dicarboxylic acids that can be used are N-trichloromethylthio tetrahydrophthalimide, N-trichloromethylthio phthalimide, N-trichloromethylthio succinimide, N-trichloromethylthio endomethylenetetrahydrophthalimide, and chlorinated N-trichloromethylthio tetrahydrophthalimide. N-trichloromethylthio tetrahydrophthalimide is especially effective and desirable.

The ranges of concentrations of the ingredients of the emulsifiable compositions of this invention to accomplish the desired results have been found to be:

89.0–99.75 vol. per cent petroleum mineral white oil
0.2–10 vol. per cent oil-soluble non-ionic or anionic emulsifier
0.05–1.0 wt. per cent N-trichloromethylthio imide of a dicarboxylic acid.

Before using, this concentrate is emulsified with enough water to give a concentrate to water ratio in the range of 1/2 to 2/1. For example, aqueous emulsions containing 50% oil and 0.2–1.0% emulsifier and 0.25 weight per cent N-trichloromethylthio imide of a dicarboxylic acid have been found to be especially effective.

The suckers may be killed by applying the composition of this invention, emulsified with water, just below the exposed surface of the freshly "topped" tobacco plant. The killing action of the oil seems to take place after it runs down the stem and reaches the active sucker tissue. The presence of the parasiticidal agent in the emulsion acts to prevent the entrance of active disease organisms at this point.

The emulsion may be applied by swab, paint brush, pressure oil can, dropper, or other convenient means. Special applicators have been developed to "top" and apply emulsion simultaneously, e. g., the "Clip Oil" described in Information Series Bulletin No. 3, October, 1950, Department of Agricultural Engineering, North Carolina Agricultural Experiment Station. Field experiments have shown that an application of about 3 cubic centimeters (0.1 ounce) of emulsion to each plant will control up to about 98% of the suckers. This means that an acre of tobacco may be treated with 5 gallons of emulsion containing 2.5 gallons of the composition of this invention. Smaller applications per plant will give poorer sucker control, while larger amounts will not appreciably improve the control.

The following examples illustrate this invention and indicate test results obtained with the compositions of this invention emulsified with water.

*Example 1*

Eight petroleum mineral white oils having viscosities in the range 88–368 SSU at 100° F. were tested in sucker control compositions on tobacco plants near Lumberton, North Carolina. Each oil was tested: (1) alone, without additive; (2) as an aqueous emulsion containing 50 volume per cent of oil and 1 volume per cent of either alkyl aryl polyoxyethylene glycol ether emulsifier or a petroleum sulfonate modified with a minor amount of non-ionic emulsifier, the balance being water; and (3) as an aqueous emulsion containing 50 volume per cent of oil, 1 volume per cent of emulsifier as in (2) and 0.25 weight per cent of N-trichloromethylthio tetrahydrophthalimide, the balance being water. The especial effectiveness of N-trichloromethylthio tetrahydrophthalimide in reducing soft rot infection in treated tobacco plants is shown in the following tabulation of test results:

| Type of Treatment | No. of Different Treatments | No. of Treatments Showing Soft Rot | Percentage of Treatments Showing Soft Rot |
|---|---|---|---|
| Oil alone | 8 | 6 | 75 |
| Plain Emulsion | 16 | 3 | 19 |
| Emulsion with N-trichloro-methylthio tetrahydro-phthalimide | 16 | 1 | 6 |

*Example II*

Eight petroleum mineral white oils having viscosities in the range 88–368 SSU at 100° F. were tested in sucker control compositions on tobacco plants near Asheville, North Carolina. Each oil was tested: (1) alone, without additive; (2) as an aqueous emulsion containing 50 volume per cent of oil and 1 volume per cent of either polyethylene glycol ester emulsifier or a petroleum sulfonate modified with a minor amount of non-ionic emulsifier, the balance being water; (3) as an aqueous emulsion as in (2) but with 0.25 weight per cent of N-trichloromethylthio tetradrophthalimide added; and (4) as an aqueous emulsion as in (2) but with 100 parts per million of the known effective alkyl dimethyl benzyl ammonium chloride germicide added. The especial effectiveness of N-trichloromethylthio tetrahydrophthalimide in reducing soft rot infection in treated tobacco plants is shown in the following tabulation of test results:

| Type of Treatment | No. of Different Treatments | Percentage of Treated Plants Showing Soft Rot |
|---|---|---|
| Oil alone | 8 | 14.5 |
| Plain Emulsion | 16 | 9.2 |
| Emulsion with N-trichloro-methylthio tetrahydrophathalimide | 16 | 3.6 |
| Emulsion with aklyl dimethyl benzyl ammonium chlordie germicide | 16 | 8.4 |

The utilization of the compositions of this invention represents extremely large labor savings, lower growing costs, and lower disease incidence.

It is to be understood that this invention is not limited to the specific examples which have been offered merely as illustrations, and that modifications may be made without departing from the spirit of this invention.

What is claimed is:

1. An emulsifiable tobacco desuckering composition which comprises in combination a petroleum mineral white oil having a specific gravity in the range of about 0.800–0.885, a boiling point predominantly in the range of about 550–1000° F., being substantially free of aromatics, and a viscosity SUS at 100° F. of 80–370, in an amount of from 89.0–99.75 volume per cent; an oil-soluble, synthetic emulsifier selected from the group consisting of non-ionic and anionic emulsifiers in an amount of from 0.2–10 volume per cent, and an N-trichloromethylthio imide of a dicarboxylic acid in an amount of from 0.05 to 1.0 weight per cent.

2. An aqueous emulsion which comprises the emulsifiable composition of claim 1 admixed with water in a range of from 1/2 to 2/1.

3. The composition of claim 2 in which the oil-soluble non-ionic emulsifier is an ethylene oxide condensation product.

4. The composition of claim 3 in which the ethylene oxide condensation product is an alkyl aryl polyoxyethylene glycol ether and the N-trichloromethylthio imide is N-trichloromethylthio tetrahydrophthalimide.

5. The composition of claim 1 in which the oil-soluble non-ionic emulsifier is an ethylene oxide condensation product.

6. The composition of claim 3 in which the ethylene oxide condensation product is an alkyl aryl polyoxyethylene glycol ether and the N-trichloromethylthio imide is N-trichloromethylthio tetrahydrophthalimide.

7. An improved process for desuckering tobacco plants which comprises applying to said plants an emulsifiable composition comprising in combination a petroleum mineral white oil having a specific gravity in the range of about 0.800 to 0.885, a boiling point predominantly in the range of about 550 to 1000° F., a viscosity S. U. S. at 100° F. of about 80 to 370, an oil-soluble synthetic emulsifier selected from the group consisting of non-ionic and anionic emulsifiers and an N-trichloromethylthio imide of a dicarboxylic acid, the proportion of oil to emulsifier to imide being 89.0 to 99.75 volume percent oil, 0.2 to 10 volume percent emulsifier and 0.05 to 1.0 weight percent imide.

8. The process of claim 7 wherein said emulsifiable composition is admixed with water in the range of from 1/2 to 2/1.

9. The process of claim 7 wherein said oil soluble emulsifier is a condensation product of ethylene oxide.

10. The process of claim 9 wherein said ethylene oxide condensation product is an alkyl aryl polyoxyethylene glycol ether and said imide is N-trichloromethylthio tetrahydrophthalimide.

References Cited in the file of this patent

UNITED STATES PATENTS

| 2,553,771 | Kittleson et al. | May 22, 1951 |
| 2,560,626 | Boissonou et al. | July 17, 1951 |

OTHER REFERENCES

"The Clip-Oil for Controlling Tobacco Suckers," Information, Series No. 3 (Special Issue), Dept. of Agricultural Engineering, N. Carolina Agr. Expt. Station Oct. 1950 (18 pages, pages 5 and 6 particularly relied upon).

"Crops and Soils," vol. 4 (Feb. 1952) page 25.

"The Lamp," published by Standard Oil Co. of New Jersey, June 1950, pages 22 to 24.